(12) United States Patent
Adolph et al.

(10) Patent No.: US 6,438,318 B2
(45) Date of Patent: *Aug. 20, 2002

(54) METHOD FOR REGENERATING THE ORIGINAL DATA OF A DIGITALLY CODED VIDEO FILM, AND APPARATUS FOR CARRYING OUT THE METHOD

(75) Inventors: Dirk Adolph, Ronnenberg; Ralf Ostermann, Hannover, both of (DE)

(73) Assignee: Thomson Licensing S.A., Boulogne (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,317

(22) Filed: Jun. 9, 1998

(30) Foreign Application Priority Data

Jun. 28, 1997 (DE) .......................... 197 27 542

(51) Int. Cl.⁷ ................................. H04N 5/91
(52) U.S. Cl. ...................... 386/111; 386/126
(58) Field of Search .............. 386/46, 68, 111, 386/112, 95, 125, 126; 348/415, 426, 390.1

(56) References Cited

U.S. PATENT DOCUMENTS

| | | | | |
|---|---|---|---|---|
| 5,479,209 A | * | 12/1995 | Miyazaki | 348/426 |
| 5,535,008 A | | 7/1996 | Yamagishi et al. | |
| 5,621,464 A | | 4/1997 | Teo et al. | 348/390 |
| 5,694,172 A | * | 12/1997 | Miyano | 348/415 |
| 5,758,011 A | | 5/1998 | Fujinami | 386/98 |
| 5,974,224 A | * | 10/1999 | Nagata | 386/111 |
| 5,982,431 A | * | 11/1999 | Chung | 386/68 |
| 6,009,229 A | * | 12/1999 | Kawamura | 386/68 |
| 6,058,241 A | * | 5/2000 | Kawamura et al. | 386/68 |

FOREIGN PATENT DOCUMENTS

| | | | |
|---|---|---|---|
| DE | 3443041 A1 | 5/1986 | |
| EP | 0664650 A1 | 7/1995 | ............ H04N/7/24 |
| EP | 689 355 A2 | 12/1995 | |
| EP | 0696798 A1 | 2/1996 | ........... G11B/20/21 |
| GB | 2 187 028 | 8/1987 | ........... G11B/27/02 |
| GB | 2 223 652 | 4/1990 | ............ H04N/7/01 |

OTHER PUBLICATIONS

SMPTE Journal, Feb. 1996, "Video Compression", by David Strachan, pp. 68–73.

* cited by examiner

*Primary Examiner*—Huy Nguyen
(74) *Attorney, Agent, or Firm*—Joseph S. Tripoli; Ronald H. Kurdyla; Joel M. Fogelson

(57) ABSTRACT

A method for regenerating the original data of a digitally coded video film is described, in which a specific picture type of a number of picture types (I, B, P) has been allocated to each of the individual pictures during coding and the coding order (DEO) does not correspond, at least in part, to the display order (DIO). This method provides for an independent time base to be used in order to recover the display order, which time base is obtained from internal information items in the decoder, the information items having been stored during the preceding decoding of a number of pictures. This method has the advantage that even with the omission of a header of a Group of Pictures (GOPH), the correct display order can still be achieved, even if the otherwise customary temporal reference codes in the bit stream signal an incorrect display order.

4 Claims, 5 Drawing Sheets

Fig. 5

| FM  | A  | B  | C  | C  | A  | C  | C  | B  | C  | C  | A  | C  | C  | B  | C  | C  | C  | B  | C  | C  | C  | A  | B  |
|-----|----|----|----|----|----|----|----|----|----|----|----|----|----|----|----|----|----|----|----|----|----|----|----|
| DEO | I0 | P3 | B1 | B2 | P6 | B4 | B5 | P9 | B7 | B8 | P12| B10| p3 | b1 | b2 | p6 | b4 | b5 | p9 | b7 | b8 | p12| P3...|
| DIO |    | I0 | B1 | B2 | P3 | B4 | B5 | P6 | B7 | B8 | P9 | B10| P12| p3 | b1 | b2 | p6 | b4 | b5 | p9 | b7 | b8 | p12 I0... |
| TR  | 0  | 3  | 1  | 2  | 6  | 4  | 5  | 9  | 7  | 8  | 12 | 10 | 3  | 1  | 2  | 6  | 4  | 5  | 9  | 7  | 8  | 12 | 10 |

| FM  | A  | B  | C  | C  | A  | C  | C  | B  | C  | C  | A  | C  | C  | B  | C  | C  | C  | B  | C  | C  | C  | A  |
|-----|----|----|----|----|----|----|----|----|----|----|----|----|----|----|----|----|----|----|----|----|----|----|
| DEO | I0 | P3 | B1 | B2 | P6 | B4 | B5 | P9 | B7 | B8 | P12| B10| p3 | b1 | b2 | p6 | b4 | b5 | p9 | b7 | b8 | p12|
| DIO |    | I0 | B1 | B2 | P3 | B4 | B5 | P6 | B7 | B8 | P9 | B10| P12| p3 | b1 | b2 | p6 | b4 | b5 | p9 | b7 | b8 |
| GOP | 1  | 1  | 1  | 1  | 1  | 1  | 1  | 1  | 1  | 1  | 1  | 1  | 1  | 1  | 1  | 1  | 1  | 1  | 1  | 1  | 1  | 2  |
| IP  | 1  | 2  | 2  | 2  | 3  | 3  | 3  | 4  | 4  | 4  | 5  | 5  | 6  | 6  | 6  | 7  | 7  | 7  | 8  | 8  | 8  | 9  |
| B   | 0  | 0  | 1  | 2  | 2  | 3  | 4  | 4  | 5  | 6  | 6  | 7  | 7  | 8  | 9  | 10 | 11 | 12 | 13 | 14 | 15 | 0  |

| P3 | I0 |
|----|----|
| p12| I0 |
| b11| I0 |
| 9  | 0  |

$t_1$   $t_2$   $t_3$ $t_E$   $t_4$ $t_5$    $t_6$

METHOD FOR REGENERATING THE ORIGINAL DATA OF A DIGITALLY CODED VIDEO FILM, AND APPARATUS FOR CARRYING OUT THE METHOD

FIELD OF THE INVENTION

The invention relates to a method for regenerating the original data of a digitally coded video film and an apparatus for carrying out the method.

BACKGROUND OF THE INVENTION

The invention is based on a method for regenerating the original data of a digitally coded video film of the generic type of the independent Claim 1. Apparatuses of this type have recently become known for example as a result of the commercially available DVD (Digital Versatile Disk) playback devices. These devices are designed in accordance with the so-called DVD Standard (Version 1.0). In this standard, reference is made to the so-called MPEG standards MPEG1 and MPEG2 with regard to the reproduction of video films. The MPEG2 standard is also known under the reference ISO/IEC 13818: 1994 "Information technology—generic coding of moving pictures and associated audio". The MPEG1 standard is also known under the designation ISO/IEC 11172: 1993 "Information Technology—coding of moving pictures and associated audio for digital storage media up to about 1.5 Mbit/s". The video coding type is defined by one of these two standards in the case of DVD. According to these standards, the individual pictures of a video film are converted into a coded digital data stream (bit stream). A wealth of information is provided in the bit stream for each picture. All the details of the digital bit stream cannot be described in detail here. Reference is made in this respect to the standards mentioned, from which the necessary details can be obtained.

Today's DVD playback devices encounter the problem that they cannot always operate without any errors in everyday operation, one of the reasons being that on account of the drastic increase in the storage density on the DVD itself, error-free reading cannot be effected in every situation. Slight scratches as well as dust and grease spots can then very easily prevent satisfactory reading of information. The nature of the recording means that even when the scratch/spot is relatively small, relatively large areas may be affected on account of the high storage density, and are not correctly evaluated. This results in poor picture and sound quality from time to time, despite error concealment measures that are present. The invention will address a specific problem with regard to picture display, but not the decoding of audio information.

As will be explained in more detail below, the video information items are stored in so-called sectors on the DVD. Such a sector comprises 2048 bytes of digital video information. Since the data in such a sector are compressed to a very great extent and correspondingly little redundancy is present, it is often the case, in spite of the fact that only a few items of data of a sector were not able to be read correctly, that the entire sector is omitted as video information because the data can no longer be completely decoded when part of the information has been lost. Consequently, it can happen that entire sectors are omitted during the reproduction of a video film. The MPEG standards MPEG1 and MPEG2 provide virtually a hierarchical division of the video data according to their importance. There are data which are important for recovering the video information items of an entire sequence of pictures; there are other data, in turn, only for recovering the information of an individual picture; and again there are other data which are absolutely necessary for recovering information items of specific sections in a picture.

The present invention will consider in further detail particularly those data which apply to a so-called Group of Pictures. The digital data stream is therefore provided with a section, called "Group of Pictures Header" GOPH, which also contains important system time reference data. A system clock is fed these data and synchronizes practically all of the operations within the DVD playback device. The system clock in the DVD playback device is from time to time readjusted by this system time reference data, thereby ensuring synchronous operation between the video decoding operation and the video encoding operation. Thus, in the same way that there is a specific GOP header for a Group of Pictures, there is also a header, called "Pictures Header", for an individual picture. This header contains inter alia a so-called temporal reference code (temporal_reference_code). This code consists of a 10-bit-wide number and in practice indicates the position of this picture within the Group of Pictures, which then finally governs when this picture is displayed within the Group of Pictures, that is to say the order of display of the pictures is indicated thereby. The individual pictures of the Group of Pictures are thus, as it were, consecutively numbered. However, since the pictures are scrambled together in a specific manner during the encoding operation, the coding order no longer corresponds to the display order. This is in turn due to the fact that in accordance with the MPEG1 and MPEG2 standards, three different picture types are provided and the pictures are accordingly coded differently. The so-called I pictures corresponding to intra-coded pictures are known. These pictures contain only information items of one picture and can therefore be decoded independently of other pictures. The so-called P pictures, corresponding to unidirectionally predicted pictures, are provided as a further picture type. These pictures have been predicted on the basis of a preceding I or P picture, with the result that their data volume is reduced. They are thus dependent on a preceding I or P picture, however. The B pictures, corresponding to bidirectionally predicted pictures, are provided as the third picture type. These pictures are dependent on two neighbouring I or P pictures. They are predicted from the neighbouring I or P pictures. The average value is formed and the difference from the original picture is calculated. Since only a fraction of video information items remain in the case of the difference, the B pictures are considerably reduced in terms of their data volume. The provision of such different picture types also necessitates the scrambling of the display order for the purposes of coding. Specifically, a B picture can only be coded when the preceding and succeeding I or P picture is present in coded form. Consequently, in the data stream the chronologically succeeding I or P picture will always appear first before the B pictures which are actually to be displayed chronologically earlier. The original display order can be recovered during the decoding operation using the concomitantly transmitted temporal reference codes. A problem arises whenever, on account of an error, a GOP header is omitted and suddenly pictures of another Group are decoded which have a smaller temporal reference code than pictures that have already been decoded and are located in a memory. Specifically, it can then happen that the pictures with the higher temporal reference code which are actually to be displayed earlier are only displayed after the pictures with the lower reference codes which are actually to be displayed later. This, of course, leads to an incorrect display of the pictures, which is clearly discernible to the viewer. Since the picture with the higher temporal reference code remains continually in a frame memory, the display order within the new Group of Pictures can continue to be scrambled. This leads to undesirable "jitter" of the picture, which is extremely disturbing. The effect will be explained in more detail below with reference to pictures.

SUMMARY OF THE INVENTION

The object of the invention is to prevent in particular the undesirable scrambling of the display order after an omission of a GOP header.

The object is achieved according to the invention by means of the method specified in the description of the preferred embodiment. According to the invention, namely, an independent time base is used to recover the display order in the DVD playback device. In this case, a few information items of the decoded data stream are buffer-stored over a specific period of time in order to ensure the independent time base. The particular advantage of these measures consists in the fact that scrambling of the display order after the omission of a GOP header does not arise.

The description of the preferred embodiment specifies advantageous information items which can be evaluated for the correct recovery of the display order.

The description of the preferred embodiment specifies an advantageous measure which can advantageously be used particularly when, in the coding operation, variable sequences of picture types are permitted and a defined sequence of picture types for the pictures to be coded does not have to be rigidly complied with.

The description of the preferred embodiment specifies an advantageous measure for a frequently selected sequence of picture types during a coding operation.

For an apparatus for carrying out the method according to the invention, it is very advantageous if a table is stored in which the information items for recovering the display order are stored for a number of decoded pictures and which is evaluated by a control unit in order to ensure the independent time base. Such a table can also be realized in a simple manner by software, with the result that the circuitry outlay remains low.

The measures in detailed in the description of the preferred embodiment are likewise advantageous since, using the counter readings of the claimed counters, it is easy to ascertain which type of picture a preceding picture was. Since the counter readings are a matter of simple numerical values, these can easily be compared with one another in order rapidly to obtain the picture type. This information combined with the information regarding whether or not the picture has already been released for display easily permit, given a joint consideration of a plurality of preceding pictures, a conclusion to be drawn regarding which picture must subsequently be released for display. According to the description of the preferred embodiment, the size of the table is advantageously adapted such that the picture sequence having the largest number of successive B pictures, including the I or P pictures adjoining these B pictures, can still just be called up in the table.

BRIEF DESCRIPTION OF DRAWINGS

Exemplary embodiments of the invention are illustrated in the drawings and are explained in more detail in the description below. In the figures:

FIG. 5 shows the chronological sequence of the processing of a video picture sequence according to the conventional method in the event of an error occurring;

FIG. 6 shows the chronological sequence of the processing of a video sequence by the method according to the invention in the event of an error occurring;

DETAILED DESCRIPTION OF THE DRAWINGS

Figure 1:
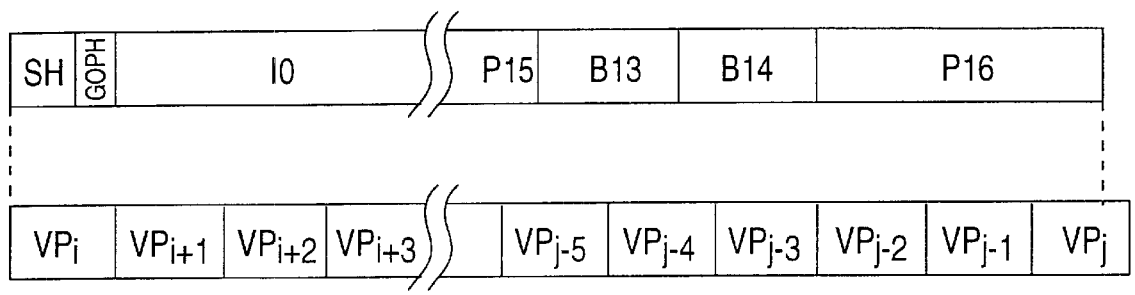
FIG. 1 shows a detail of data stored on a DVD and their division between the sectors of the DVD.
Figure 2:
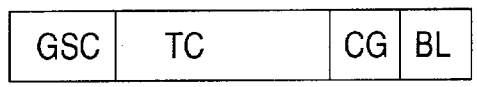
FIG. 2 shows the structure of a GOP header.

The invention is explained in more detail using the example of a video picture decoding unit of a DVD playback device. In FIG. 1, a header for a video picture sequence is designated by the reference symbol SH. The reference symbol GOPH designates a GOP header. I0 designates the data of the first video picture. The latter is an I picture. P15 designates the data of the sixteenth video picture. The latter is a P picture. B13 and B14 accordingly designate video data of the 14th and 15th video pictures. The latter are both B pictures. P16 designates the 17th video picture. The latter is accordingly a P picture. The lower part of FIG. 1 illustrates sectors which are designated by the reference symbols $VP_1$ to $VP_j$. All of the sectors have an identical length of 2,048 bytes. Accordingly, the first video picture I0 occupies a larger number of sectors. The video picture P16 occupies the last three sectors $VP_{j-2}$ to $VP_j$ illustrated. The header GOPH from FIG. 1 is illustrated in more detail in FIG. 2. The start code of the Group of Pictures is designated by the reference symbol GSC. This is an unambiguous code within the data stream. A time code information item (system time reference) is designated by the reference symbols TC. As described, this time code information item TC serves to readjust the system clock in the DVD playback device. The reference symbols CG and BL designate the information items closed_gap and broken_link which are provided in the MPEG2 standard but whose meaning is not necessary for a deeper understanding of the invention and so is not explained in more detail here.

Figure 3:
FIG. 3 shows the structure of a Picture header.

In the Picture header illustrated in FIG. 3, the reference symbol PSC designates the picture start code. This picture start code, too, can be identified unambiguously in the bit stream. The reference symbol TR designates a temporal reference code for the picture. As already explained, this temporal reference code specifies the position of the picture within the Group of Pictures. With this information, the order of the pictures is determined in conventional DVD playback devices. Since a 10-bit data word is involved, a total of 1,024 pictures which might occur in practice within an individual Group of Pictures can be consecutively numbered. In the DVD standard, however, it is recommended to establish groups of pictures with at most 15 or 18 pictures. The reference symbol PCT specifies the picture type of the picture. The further details in FIG. 3 relate to the parameters vbv_delay, full_pel_forward_vector, forward_f_code, full_pel_backward_vector, backward_f_code, extra_bit_picture and extra_information_picture defined in the MPEG2 standard. These information items, too, are not of any major importance for a further understanding of the invention and so are not explained any further here.

Figure 4:
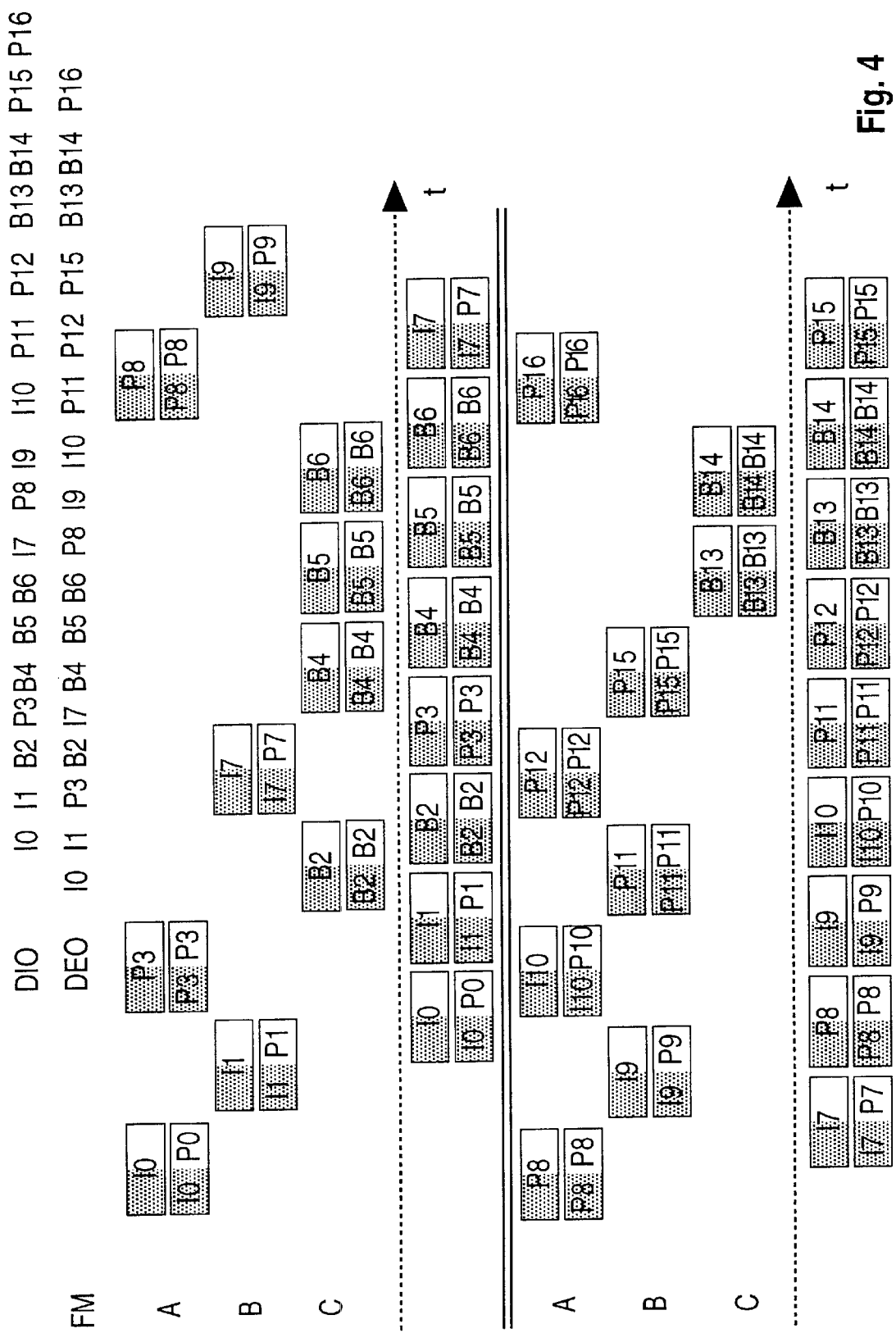
FIG. 4 shows the chronological sequence of a decoding operation of a sample video picture sequence.

The chronological sequence of the decoding and displaying of pictures of a Group of Pictures is illustrated in more detail in FIG. 4. The sequence of pictures, in the way that it is ultimately intended to be displayed, is indicated in the top line in FIG. 4. This line is designated by the reference symbol DIO. Virtually a random sequence of I, B, P pictures has been chosen in FIG. 4. Although such a sequence of pictures is permitted according to the DVD standard, it does not constitute the optimum sequence as is recommended for DVD playback devices. This will be discussed in more detail below. The line of FIG. 4 which is designated by the reference symbol DEO indicates the decoding order for the sequence of pictures that is located in the line above. As previously described, this differs from the display order by the fact that the B pictures, which are arranged chronologically before a P or I picture in the display order, are decoded only after the P or I picture. The exact chronological sequence when a picture of this sequence is decoded and when it is released for display or is displayed can be discerned in the other two parts of FIG. 4. In this case, the reference symbol FM indicates an abbreviation for a frame memory. Three frame memories A, B, C are provided for the example. The I picture I0 is written first of all to the frame memory A after the decoding operation. Next, the I picture I1 is decoded and written to the frame memory B. An individual picture is in this case divided in two, which is indicated by the hatching of one half of the picture. The hatched area represents the first field of the respective picture, while the non-hatched area indicates the second field of the respective picture. According to the MPEG2 standard, there are two different ways of coding pictures. In the first case, a picture is coded with the two fields together as a single picture (frame pictures). In the second case, the individual fields are each coded separately (field picture). FIG. 4 illustrates both types of picture coding. This situation has utilized the special feature that in the event of decoding an I picture with separately coded fields, it is possible to code the first field as an I picture and to code the second field as a P picture. Therefore, in each of the I pictures, one field is designated as an I picture and the second field as a P picture. In the case of the B and P pictures, both fields must be coded identically.

FIG. 4 clearly reveals that a time delay of three fields exists between the decoding of the first I picture, the I0, and its release for display. The first I picture, the I0, is released for display at the beginning of the decoding of the second field of the I picture I1. The vertical synchronization pulses are used for complying with this time offset. The instants at which the decoded pictures are displayed can in each case be seen in the part of FIG. 4 below the dashed time axis. An additional special feature is that in the case of B pictures, the decoding instant and the display instant are in each case offset from one another only by one field. Moreover, the B pictures are exclusively entered in the frame memory C. The frame memory C is then organized in such a way that the first part, that is to say the part in which the first field is located, is in each case already being read for the display of the picture while the second field is still being written to the second part of the memory. The other frame memories A and B are also designed in the same way.

FIG. 5 illustrates a frequently used sequence of pictures which is also used for recording video data on a DVD. In this sequence of pictures, an I or P picture is in each case followed by two B pictures. A Group of Pictures is formed by 13 pictures I0–P12. This is then followed by the next Group of Pictures, which is constructed in the same way. The display order of the pictures is illustrated in the line designated by DIO. The line bearing the reference symbol DEO once again shows the decoding order of the pictures, that is to say the order in which the pictures occur in the bit stream. The line which is designated by the reference symbol FM respectively specifies the frame memory to which the decoded picture located underneath is written. The line designated by TR in each case specifies the temporal reference code of the respective picture.

FIG. 5 now shows the particular situation whereby a reading error occurs at the instant $t_E$, that is to say both the succeeding picture B11 and the succeeding GOP header and the picture I0 of the next Group of Pictures can no longer be read correctly and, therefore, cannot be decoded correctly either. Instead of this, the first thing that a detection circuit finds next is the correct picture header of the picture p3 in the bit stream and the decoder starts to decode from that point on. The further part of FIG. 5 shows in detail what happens in that case in the event of re-establishing the display order based on the temporal reference code. The decoded picture p3 is displayed next after the display of the picture B10. Specifically, this picture p3 has a temporal reference code of 3, which is smaller than the temporal reference code of the picture p12 located in the memory A. Consequently, the picture p3 of a following Group of Pictures, which picture p3 is actually to be displayed later, is in fact displayed earlier than the previously decoded picture p12 of the preceding Group of Pictures. This keeping back of the decoded picture p12 also propagates during the decoding of the further pictures of the second Group of Pictures. Thus, all of the pictures b1 and b2 and also p6, b4, b5, b9, b7, b8 are output first before the picture P12. In this case, it may also be regarded as particularly disturbing that the pictures, p6 and p9 are each displayed before the pictures b4 and b5 and, respectively, b7 and b8, even though they ought actually not to be displayed until after these B pictures. The result of this is a scrambling of the picture order, which becomes greatly apparent to the viewer in the form of picture "jitter". This is due to the fact that virtually all the pictures have to be output immediately because the picture P12 remains permanently in the frame memory A and therefore only a frame memory B is available for the P and I pictures. At the instant $t_G$ a new GOP header is correctly evaluated and the sequence of pictures therefore settles down starting from this instant, since now the temporal reference codes of the new Group of Pictures are handled separately. The picture p12 would be displayed as last picture of the preceding Group of Pictures. It should also be mentioned that not only is the picture order scrambled, as described, but also the decoded pictures p3 to p12 are displayed with errors since, after all, they have actually been predicted on the basis of other pictures, namely on the first I picture iO, in particular, but this has been omitted. The prediction instead takes place based on the last picture of the preceding Group of Pictures I0–P12. The respective picture content then governs to a very great extent whether these errors can be discerned to a very great extent in the pictures. In the event of a scene change between picture P12 and iO, large areas of the picture will certainly be displayed incorrectly. However, if a film sequence in which there is little movement in the picture is concerned, it may well be that these errors would not even stand out clearly to the viewer.

FIG. 6 illustrates the same example as in FIG. 5, but in this case the measures according to the invention are taken, which is indicated by the lines bearing the reference symbols GOP, IP and B. The other lines correspond to the first three lines of FIG. 5. The reference symbol GOP designates a GOP error. The latter is incremented whenever a GOP header has been correctly evaluated and has thus been found in the bit stream. The reference symbol IP designates an IP counter. The latter is incremented whenever an I or P picture has been identified in the bit stream. This counter is reset after a GOP header has been correctly found. The reference symbol B designates a B counter. This counter is incremented whenever a B picture has been found in the data stream. This counter is also reset to zero when a GOP header has been correctly found. After the occurrence of the reading error at the instant $t_E$, in this case the P picture P12 still located in the memory is output next. The further pictures b1 to b12 are also displayed in the correct order. This is due to the fact that the display order is determined not on the basis of the temporal reference code specified in the P picture header; rather an independent time base on the basis of the counter readings of the GOP, IP and B counters is used. The way in which each of these counter readings is evaluated is explained in more detail below.

Figure 7:
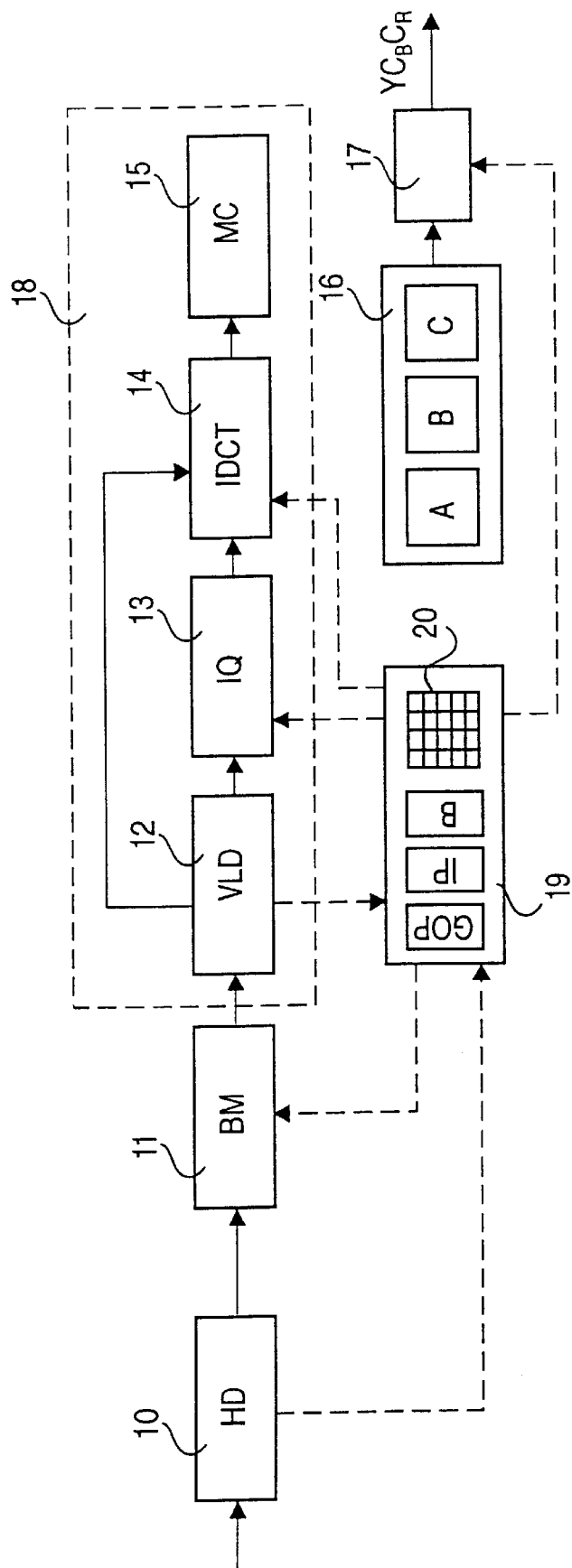
FIG. 7 shows a rough block diagram of the apparatus according to the invention.

To that end, the block diagram according to FIG. 7 is firstly described in more detail. The figure shows the functional units and the signal flow in an MPEG2 decoder. The reference number 10 designates a detection circuit for the start codes of the various headers GOP header, picture header, etc. The reference number 11 designates a buffer memory for the read data of the data stream. The reference number 12 designates a decoding unit which reverses the variable length coding of the video data. The reference number 13 designates a processing stage which carries out inverse quantization. The reference number 14 designates a computing circuit in which the DCT transform is reversed. In other words, an inverse discrete cosine transform takes place. The reference number 15 designates a circuit in which motion compensation for the individual pictures is carried out. Finally, the data decoded in this way are written to the memory unit 16, which contains the three aforementioned frame memories, A, B and C. The reference number 17, finally, designates a post-processing stage. A series of parameters which characterize the coded signal and can optionally be transmitted in the bit stream are then processed here. These parameters include for example information items for the matrixing of the chrominance and for PAL or NTSC colour modulation. The finished video signal appears in the $YC_BC_R$ format at the output of the stage 17. The reference number 19 designates a control unit which controls the diverse components of the decoder. It contains the GOP, IP and B counters already mentioned.

The method of operation of the individual components is disclosed to the relevant person skilled in the art by diverse publications and, therefore, does not need to be explained in any further detail here. However, the way in which the control unit 19 determines the display order, even in the situation where a GOP header in the bit stream is omitted, will be explained in more detail below in connection with FIG. 8.

Figure 8:
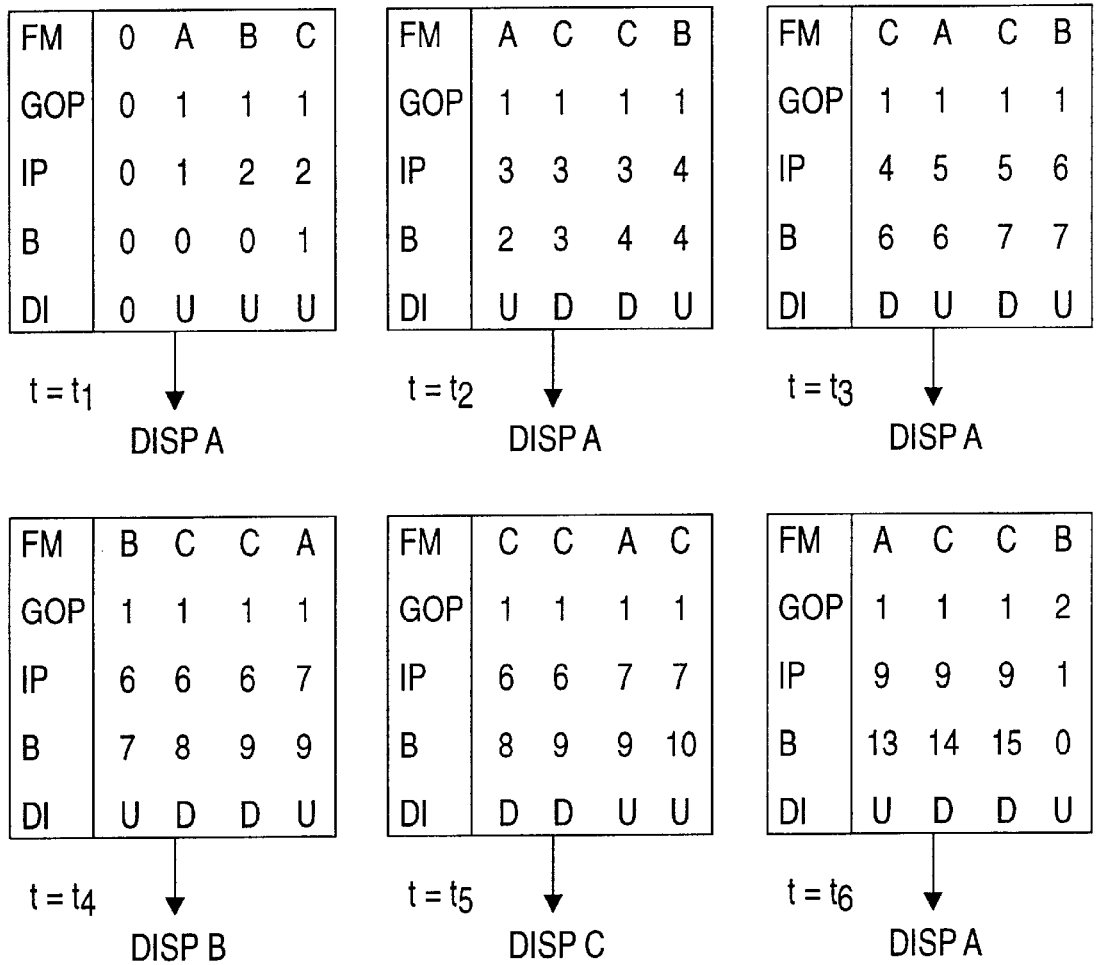
FIG. 8 shows the entries in the table at selected instants of the video picture sequence illustrated in FIG. 6.

For this purpose, a table 20 is provided in the control unit 19. Information items regarding the last four decoded pictures of the bit stream are continuously held in this table. FIG. 8 illustrates the entries in the table for the instants $t_1$, $t_2$, $t_3$, $t_4$, $t_5$ and $t_6$ of FIG. 6. The table 20 comprises in practice five shift stores, in each of which the entries are shifted across by one location after the decoding of the first field of a picture. At this instant, it is then also necessary to decide in each case which picture is to be displayed next. Reference is once again made to FIG. 4 in this respect. In the first example for the instant $t_1$, the entries in the line bearing the reference symbol DI in each case indicate for four successive pictures whether or not the respective picture has already been displayed at the last updating instant of the table. Since only three pictures have been decoded at the instant $t_1$, in each case a zero is still entered everywhere at the first location of the table. From the fact that of the three remaining decoded pictures none has yet been displayed, and also from the fact that the first and second decoded pictures are each a matter of an I or P picture, which can been seen from the counter readings, on the one hand, and, on the other hand, from the fact that the pictures have been entered into the frame memories A or B, it immediately follows that the third picture that arrived is to be displayed between these two pictures, because it is a B picture. At this instant, then, the first decoded picture from the frame memory A must be displayed. This is indicated by the command DISP A underneath the table.

The entries in the table at the instant $t_2$ appear such that the two B pictures which were each entered into the frame memory C have already been displayed and a previously decoded picture is still available in the frame memory A and, in addition, a further I or B picture has been newly written to the frame memory C. Since the B pictures have already been output, it follows that the picture located in the memory A must be output next. The P picture P6 is thus output next, which is still held in the frame memory A at the instant $t_2$.

A the instant $t_3$, the following configuration is produced in the table 20: the oldest picture is a B picture and has already been displayed. The next picture entered is one which must be an I or P picture, but this has not yet been displayed. There then follows, finally, a B picture which has already been displayed, followed by an I or P picture which has not yet been displayed. This configuration reveals that the picture located in the frame memory A must be displayed next since, after all, this must represent a basis for the second B picture which, however, has already been displayed. At the instant $t_3$, therefore, the P picture P12 still located in the memory A is released for display.

The configuration in the table 20 at the instant $t_4$ is such that the memory B contains an I or P picture which has not yet been displayed and B pictures are entered next which have already been displayed, followed by an I or P picture which has not yet been displayed. From this, it then follows for the same reasons as at the instant $t_2$ previously that the picture in the frame memory B is to be displayed next.

The configuration of the table 20 at the instant $t_5$ reveals that two B pictures have already been displayed and an I or P picture has been entered next in the frame memory A, followed by a further B picture. This reveals that the picture located in the memory C must be output next because although the picture located in the memory A has to be a reference for this B picture in the memory C, the earlier reference must be located in the memory B.

The instant $t_6$ is considered as the last example. Here, the configuration is the same as at the instant $t_2$, with the result, that in this case, too it follows that the picture located in the frame memory A is to be output next. This is the P picture p12 at the instant $t_6$. All further configurations for the sequence of FIG. 6 can be established and evaluated accordingly by the person skilled in the art on the basis of the examples explained.

It should also be mentioned that for a simplified exemplary embodiment, the counters GOP, IP and B may also be dispensed with if it is ensured during the decoding process that the I and P pictures are in each case entered exclusively into the frame memories A and B and the B pictures are entered exclusively into the frame memory C. It is then possible to draw a conclusion directly from this fact as to whether an I or P picture is involved or whether a B picture is involved. The table would then, of course, be distinctly simplified. As an alternative to the entries in the table for the GOP, IP and B counter readings, provision may also be made for entering a corresponding code for the respective picture type of a decoded picture into the table. The table and the evaluation method are preferably realized with the aid of a corresponding computer program. The rules to be observed have been explained comprehensively, so that this computer program can easily be realized by a person skilled in the art.

In the event that arbitrary picture sequences are permitted and have to be evaluated, the picture order can, nevertheless, easily be ascertained by the method described. If a configuration is produced which cannot be unambiguously decided by the said rules, it would then be necessary, however, to enlarge the table accordingly so that even further information items from preceding decoded pictures are contained. As a result, even arbitrary picture sequences can then be evaluated and the picture order be recovered.

The method described and the apparatus described can be practically employed not only in DVD playback devices but also in all other devices in which "MPEG-similar" decoders are used, that is to say in which it is likewise necessary to decode different picture types and the decoding order does not correspond to the coding order. Particular mention may be made of satellite receivers or set-top boxes for terrestrial or cable-based reception of digital television. Corresponding plug-in cards for computers may also be mentioned.

What is claimed is:

1. Method for regenerating original data of a digitally coded video film, wherein a specific picture type of a number of picture types, namely I, B and P picture types, has been allocated to each of the individual pictures during coding and the coding order not corresponding, at least in part, to a display order, wherein the digitally coded video film comprises a group of pictures in the form IPBBPBBPBB . . . comprising the steps of:

incrementing a GOP counter upon detection of a group of Pictures Header in the bitstream;

decoding a video frame of the video film;

writing of the decoded video frame in a respective one of three available frame memories, incrementing a B counter after decodation of a B frame;

incrementing a P counter after decodation of a I or P frame;

updating the corresponding entry for the decoded video frame in a table with the following information items:

a reference to the frame memory in which the decoded video frame is stored, follow up information regarding the displaying status of the video frames in the frame memories, evaluating the entries in said table and said GOP-, IP- and B-counters for error detection and error concealment.

2. Method according to claim 1, wherein there is a dedicated frame memory exclusively used for storing B pictures, and I or P pictures are written in one of the remaining two frame memories.

3. Apparatus for regenerating the original data of a digitally coded video film, having decoding means, having three frame memories having a control unit, wherein a table is provided with entries for a number of successively decoded video frames, wherein the digitally coded video film comprises a group of pictures in in the form IPBBPBBPBB . . . and in which the following information items are entered each time a video frame of the sequence has been decoded:

a reference to the frame memory in which the decoded video frame is stored, a follow up information regarding the displaying status of the video frames in the frame memories, further having a GOP counter for counting the detected group of pictures header in the video stream, and having an IP counter for counting I and P pictures, and having a B counter for counting B pictures, and, wherein the control unit evaluates the entries in the table and the GOP-, IP-, and B-counter for error detection and error concealment.

4. Method according to claim 3, wherein a dedicated one of the three frame memories is exclusively used for storing B pictures, and I or P pictures are written in one of the remaining two frame memories.

* * * * *